United States Patent
Conlon et al.

(10) Patent No.: US 12,515,557 B2
(45) Date of Patent: Jan. 6, 2026

(54) ELECTRIC VEHICLE RECHARGE CONTROL

(71) Applicant: GM GLOBAL TECHNOLOGY OPERATIONS LLC, Detroit, MI (US)

(72) Inventors: Brendan M. Conlon, Rochester Hills, MI (US); Zhijian J. Wu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 554 days.

(21) Appl. No.: 18/159,727

(22) Filed: Jan. 26, 2023

(65) Prior Publication Data

US 2024/0253523 A1  Aug. 1, 2024

(51) Int. Cl.
*H02J 7/00* (2006.01)
*B60L 3/00* (2019.01)
*B60L 58/19* (2019.01)
*B60L 58/22* (2019.01)

(52) U.S. Cl.
CPC ............ *B60L 58/19* (2019.02); *B60L 3/0046* (2013.01); *B60L 58/22* (2019.02); *H02J 7/0024* (2013.01)

(58) Field of Classification Search
USPC ........................................................ 320/109
See application file for complete search history.

(56) References Cited

U.S. PATENT DOCUMENTS

| | | | |
|---|---|---|---|
| 10,500,980 B2 | 12/2019 | Conlon | |
| 11,186,202 B2* | 11/2021 | Sugimura | ............... B60L 58/19 |
| 2019/0165713 A1* | 5/2019 | Namuduri | ............... B60L 58/19 |
| 2019/0359067 A1* | 11/2019 | Hu | ........... H02J 7/0019 |
| 2020/0070667 A1* | 3/2020 | Wang | ...................... B60L 58/19 |

* cited by examiner

*Primary Examiner* — Samuel Berhanu
(74) *Attorney, Agent, or Firm* — Quinn IP Law (57) ABSTRACT

An electric vehicle includes a reconfigurable energy storage system with a first submodule and a second submodule. An interface circuit is operable to transfer a charging power to the reconfigurable energy storage system from a charging station that is external to the electric vehicle. A switching circuit is operable to electrically arrange the first submodule and the second submodule in series or in parallel. A diode is operable to convey the charging power between the first submodule and the second submodule while the reconfigurable energy storage system is arranged in series and the charging power is present. A bias circuit is operable to maintain a reverse bias across the diode while the reconfigurable energy storage system is arranged in series and the charging power is absent.

20 Claims, 6 Drawing Sheets

ELECTRIC VEHICLE RECHARGE CONTROL

GOVERNMENT FUNDING

This invention was made with Government support under Agreement No. DE-EE0008361, awarded by the Department Of Energy. The Government may have certain rights in the invention.

INTRODUCTION

The present disclosure relates to a system and a method for electric vehicle recharge control. Power rectifiers are used to couple automotive battery modules in series during recharging from an off-board charger. Indeterminate conditions sometimes occur across the power rectifiers during recharge initialization before the off-board charger is fully connected, and while current is not being supplied by the connected off-board charger. The indeterminate conditions may cause interface issues with the off-board charger, on-board diagnostics, and control processes due to low or unsteady voltages at the off-board charge interface or other on-board sensed voltages.

Accordingly, those skilled in the art continue with research and development efforts in the field of controlling the serial coupling of battery modules during a recharging initialization phase.

SUMMARY

An electric vehicle is provided herein. The electric vehicle includes a reconfigurable energy storage system, an interface circuit, a switching circuit, a diode, and a bias circuit. The reconfigurable energy storage system includes a first submodule and a second submodule. The reconfigurable energy storage system is operable to store electrical energy, recharge from a charging power while in a series mode, and discharge while in a parallel mode. The interface circuit is operable to transfer the charging power to the reconfigurable energy storage system from a charging station external to the electric vehicle. The switching circuit is operable to electrically arrange the first submodule and the second submodule in series to place the reconfigurable energy storage system in the series mode, and electrically arrange the first submodule and the second submodule in parallel to place the reconfigurable energy storage system in the parallel mode. The diode includes a first node and a second node. The diode is operable to convey the charging power between the first submodule and the second submodule while the reconfigurable energy storage system is in the series mode and the charging power is present. The bias circuit is directly connected to the diode, and operable to maintain a reverse bias across the diode while the reconfigurable energy storage system is in the series mode and the charging power is absent.

In one or more embodiments, the electric vehicle further includes a vehicle chassis ground. The bias circuit includes a first resistance, a second resistance, and a third resistance. The first resistance is directly connected between the first node and the second node, and is operable to generate the reverse bias across the diode. The second resistance is directly connected between the first node and the vehicle chassis ground. The third resistance is directly connected between the second node and the vehicle chassis ground.

In one or more embodiments of the electric vehicle, the third resistance is coupled between the first submodule and the vehicle chassis ground.

In one or more embodiments, the electric vehicle further includes a vehicle chassis ground. The bias circuit includes a first resistance, a second resistance, a third resistance, a third node and a bias switch. The bias switch is directly connected between the second node and the third node. The bias switch is operational to close while the reconfigurable energy storage system is in the series mode, and open while the reconfigurable energy storage system is in the parallel mode. The first resistance is directly connected between the first node and the third node. The bias switch and the first resistance are operational to generate the reverse bias across the diode. The second resistance is directly connected between the first node and the vehicle chassis ground, and operational to enable the first node to rise above the vehicle chassis ground. The third resistance is directly connected between the second node and the vehicle chassis ground, and operational to enable the second node to fall below the vehicle chassis ground.

In one or more embodiments, the electric vehicle further includes an isolation switch connected between the diode and the first submodule. The isolation switch is operational to close while the reconfigurable energy storage system is in the series mode, and open while the reconfigurable energy storage system is in the parallel mode.

In one or more embodiments of the electric vehicle, the interface circuit is further configured to close a pre-charge switch and an opposing one of a plurality of power contactors to receive a pre-charge current from the charging station, and close another of the plurality of power contactors to receive the charging power from the charging station.

In one or more embodiments, the electric vehicle further includes a plurality of power contactors coupled between the charging station and the reconfigurable energy storage system, and operational to convey the charging power while the reconfigurable energy storage system is in the series mode.

In one or more embodiments of the electric vehicle, the first submodule is a 400 volt direct current submodule, and the second submodule is another 400 volt direct current submodule.

In one or more embodiments of the electric vehicle, the interface circuit includes a power contactor, a pre-charge resistance, and a pre-charge switch. The power contactor is coupled between the charging station and the reconfigurable energy storage system. The pre-charge resistance is coupled in parallel to the power contactor, and is operable to transfer a biasing current from the charging station that forward biases the diode. The pre-charge switch is coupled in series with the pre-charge resistance, operable to close to enable the biasing current through the pre-charge resistance, and operational to open to extinguish the biasing current.

A method for controlling a recharge of an electric vehicle is provided herein. The method includes storing electrical energy in a reconfigurable energy storage system that includes a first submodule and a second submodule, arranging electrically with a switching circuit the first submodule and the second submodule in series to place the reconfigurable energy storage system in a series mode, transferring a charging power to the reconfigurable energy storage system from a charging station external to the electric vehicle, recharging the reconfigurable energy storage system with the charging power while the reconfigurable energy storage system is in the series mode, and conveying the charging power between the first submodule and the second submodule through a diode while the reconfigurable energy storage system is in the series mode and the charging power is present. The diode includes a first node and a second node. The method further includes maintaining a reverse bias across the diode with a bias circuit while the reconfigurable energy storage system is in the series mode and the charging power is absent, arranging electrically with the switching circuit the first submodule and the second submodule in parallel to place the reconfigurable energy storage system in a parallel mode, and discharging the reconfigurable energy storage system while the reconfigurable energy storage system is in the parallel mode.

In one or more embodiments, the method further includes generating the reverse bias across the diode with a first resistance. The first resistance is directly connected between the first node and the second node. A second resistance is directly connected between the first node and a vehicle chassis ground. A third resistance is directly connected between the second node and the vehicle chassis ground.

In one or more embodiments of the method, the third resistance is coupled between the first submodule and the vehicle chassis ground.

In one or more embodiment, the method further includes closing a bias switch while the reconfigurable energy storage system is in the series mode. The bias switch is directly connected between the second node and a third node. Generating the reverse bias across the diode with the bias switch and a first resistance. The first resistance is directly connected between the first node and the third node. A second resistance is directly connected between the first node and a vehicle chassis ground. A third resistance is directly connected between the second node and the vehicle chassis ground. Opening the bias switch while the reconfigurable energy storage system is in the parallel mode.

In one or more embodiments, the method further includes closing an isolation switch while the reconfigurable energy storage system is in the series mode. The isolation switch is connected between the diode and the first submodule. Opening the isolation switch while the reconfigurable energy storage system is in the parallel mode.

In one or more embodiments of the method, the transferring of the charging power includes closing a pre-charge switch and an opposing one of a plurality of power contactors in an interface circuit to receive a pre-charge current from the charging station; and closing another of the plurality of power contactors to receive the charging power from the charging station.

In one or more embodiments, the method further includes conveying the charging power through a plurality of power contactors while the reconfigurable energy storage system is in the series mode. The plurality of power contactors is coupled between the charging station and the reconfigurable energy storage system.

In one or more embodiments of the method, the first submodule is a 400 volt direct current submodule, and the second submodule is another 400 volt direct current submodule.

In one or more embodiments, the method further includes opening a power contactor coupled between the charging station and the reconfigurable energy storage system, closing a pre-charge switch arranged in series with a pre-charge resistance, and transferring a biasing current from the charging station through the pre-charge switch and the pre-charge resistance to forward bias the diode. The pre-charge resistance and the pre-charge switch are coupled in parallel to the power contactor. Opening the pre-charge switch to extinguish the biasing current.

An electric vehicle is provided herein. The electric vehicle includes a reconfigurable energy storage system, an interface circuit, a switching circuit, and a diode. The reconfigurable energy storage system includes a first submodule and a second submodule. The reconfigurable energy storage system is operable to store electrical energy, recharge from a charging power while in a series mode, and discharge while in a parallel mode. The interface circuit is operable to transfer the charging power to the reconfigurable energy storage system from a charging station external to the electric vehicle. The switching circuit is operable to electrically arrange the first submodule and the second submodule in series to place the reconfigurable energy storage system in the series mode, and electrically arrange the first submodule and the second submodule in parallel to place the reconfigurable energy storage system in the parallel mode. The diode includes a first node and a second node. The diode is operational to convey the charging power between the first submodule and the second submodule while the reconfigurable energy storage system is in the series mode and the charging power is present. The interface circuit includes a power contactor, a pre-charge resistance, and a pre-charge switch. The power contactor is coupled between the charging station and the reconfigurable energy storage system. The pre-charge resistance is coupled in parallel to the power contactor, and is operable to transfer a biasing current from the charging station that forward biases the diode. The pre-charge switch is coupled in series with the pre-charge resistance, is operable to selectively close to enable the biasing current through the pre-charge resistance, and is operable open to extinguish the biasing current.

In one or more embodiments, the electric vehicle further includes an isolation switch connected between the diode and the first submodule. The isolation switch is operational to close while the reconfigurable energy storage system is in the series mode, and open while the reconfigurable energy storage system is in the parallel mode.

The above features and advantages and other features and advantages of the present disclosure are readily apparent from the following detailed description of the best modes for carrying out the disclosure when taken in connection with the accompanying drawings.

DETAILED DESCRIPTION

Electric vehicle infrastructure is capable of charging electric vehicles at a high voltage (e.g., 800 volts direct current (Vdc)) while vehicle battery packs are designed to operate at a lower voltage (e.g., 400 Vdc). Embodiments of the disclosure provide a series-parallel battery pack (e.g., a reconfigurable energy storage system) arrangement. One or more forward biased diode may be used to connect two or more battery submodules (e.g., internal battery packs, battery modules, or strings of battery cells) of the battery pack together in series to allow charging at the high voltage. The diode is generally used to control the direction of current flow to prevent potential damage caused by fault conditions, such as improper connections of the batteries and charging system in either serial connection or parallel connection configuration. The bias circuit across the diode provides sufficient reverse biasing voltage and/or current to the diode to maintain a near-constant series voltage under near-zero current conditions. The low current condition and/or the reverse-biased conditions occur during recharging initialization states that may exist before switching devices are closed to connect the battery pack to an off-board (or external) charging station, and/or while current is not being supplied to the battery pack by the charging station. The reverse-biasing voltage and/or the low current avoids interface issues with the charging station, on-board diagnostics, and/or control processes due to the low or unsteady voltage at the charge interface and/or other on-vehicle sensed voltages.

In various embodiments, a voltage is applied across the diode by the bias circuit. The bias circuit is formed by a network of isolation resistances, the battery submodules, and a resistance arranged in parallel to the diode. In such embodiments, the diode remains reverse biased, a voltage across the diode is limited to a small value due to the parallel resistance, and current flow is generally through the parallel resistance. In various embodiments, a small biasing current is supplied through the diode from the external charging station through a pre-charge resistance. In other embodiments, an isolation circuit may be connected in series with the diode. While the battery submodules are arranged in series, the isolation circuit supports a low impedance path between a negative terminal of one battery submodule and a positive terminal of another battery submodule. While the battery submodules are arranged in parallel, the isolation circuit may provide a high impedance path between the negative terminal of the one battery submodule and the positive terminal of the other battery submodule to reduce a parasitic current between the battery submodules.

Additional switches may provide for pre-charging of vehicle high voltage propulsion components and high voltage accessory components from the reconfigurable energy storage system. An on-vehicle DC (direct current) charger interface includes a charge receptacle and more switches to connect the charge receptacle to the energy storage system. When charging the electric vehicle, receptacle positive and negative high voltage circuits and a vehicle chassis ground are electrically connected together through the charge receptacle to corresponding circuits of the charging station. The various components may include isolation resistances from the positive high voltage circuits and/or the negative high voltage circuit to the vehicle chassis ground.

Figure 1:
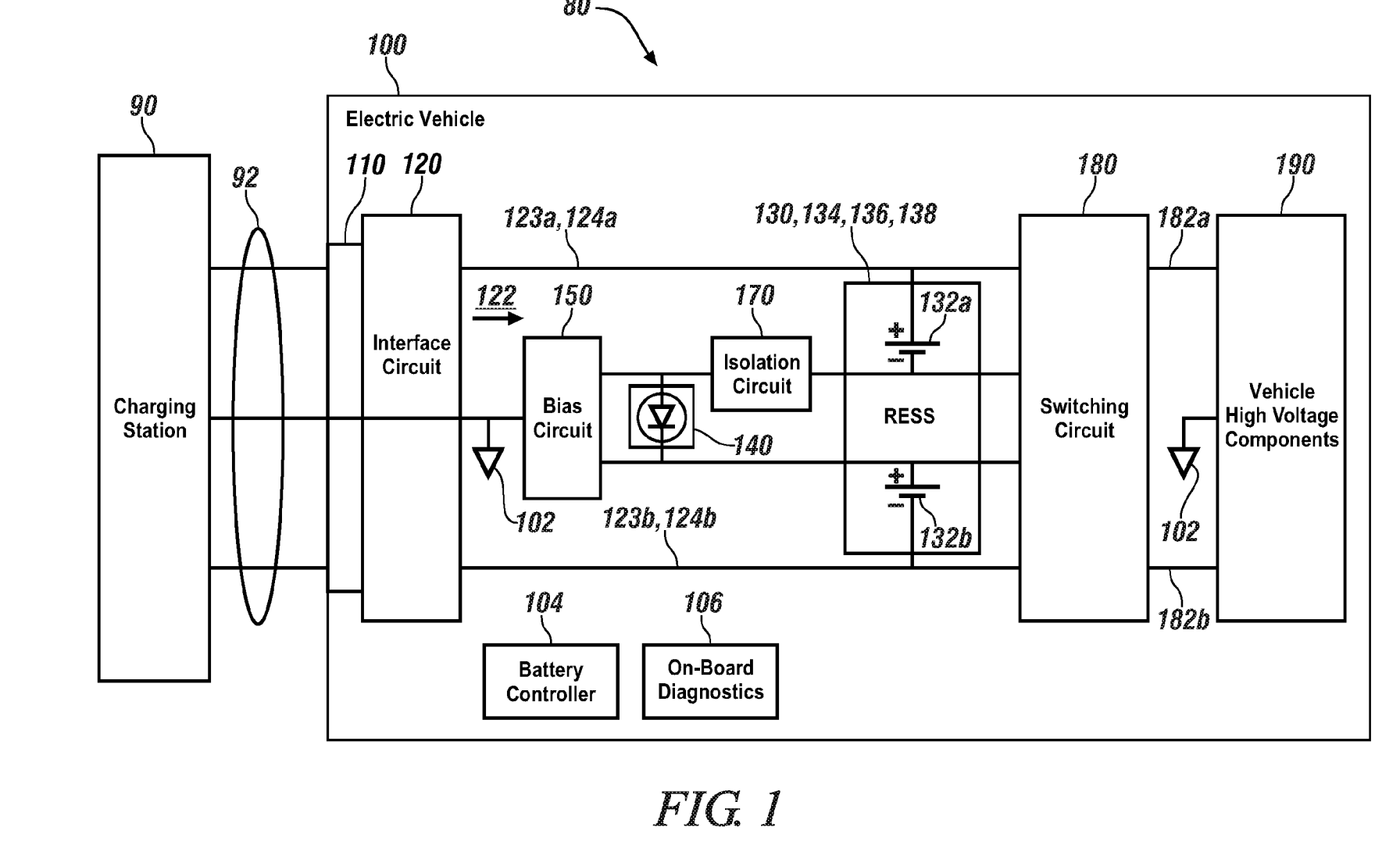
FIG. 1 is a schematic diagram of a system in accordance with one or more exemplary embodiments.

Referring to FIG. 1, a schematic diagram of an example implementation of a system 80 is shown in accordance with one or more exemplary embodiments. The system 80 generally includes a charging station 90 with a cable 92, and an electric vehicle 100. The electric vehicle 100 includes a vehicle chassis ground 102, a battery controller 104, an on-board diagnostics circuit 106, a charging receptacle 110, an interface circuit 120, a reconfigurable energy storage system 130, a diode 140, a bias circuit 150, an optional isolation circuit 170, a switching circuit 180, and multiple vehicle high voltage components 190.

The charging station 90 implements an electric vehicle supply equipment (EVSE). The charging station 90 is operational to provide electrical power (e.g., electrical current at a voltage) to the electric vehicles 100 to recharge the reconfigurable energy storage system 130. In various embodiments, the charging station 90 may be compliant with the Open Charge Point Protocol (OCPP) 1.6 standard and the International Organization for Standardization (ISO) 15118 standard. The charging stations 90 may be a DC Level 3 fast charger. Other charging standards may be implemented to meet the design criteria of a particular application.

The charging station 90 and the battery controller 104 communicate bidirectionally through a control pilot signal and communication link in the cable 92. The control pilot signal is used to sense, initiate, control, and end a fast recharging session between the charging station 90 and the vehicle 100. During the fast recharging session, the charging station 90 may provide a charging power 122 at a charging voltage 124a (positive side) to 124b (negative side) to the electric vehicle 100. The charging voltage 124a-124b may range from approximately 400 Vdc to approximately 1,500 Vdc. The charging power 122 may range from approximately 24,000 watts to approximately 1,000,000 watts.

The electric vehicle 100 implements an electric-powered vehicle, a hybrid vehicle, or a plug-in hybrid vehicle. In various embodiments, the electric vehicle 100 may be compliant with the Level 3 fast charging standard. Other standards may be implemented to meet the design criteria of a particular application. In various embodiments, the electric vehicle 100 may include, but is not limited to, a passenger vehicle, a truck, an autonomous vehicle, a motorcycle, a boat, and/or an aircraft. Other types of electric vehicles 100 may be implemented to meet the design criteria of a particular application.

The battery controller 104 implements a vehicle interface control module (VICM). The battery controller 104 is generally operational to control one or more profiles and/or modes of the reconfigurable energy storage system 130. The profiles may include a pack charging profile, a fast charging profile and/or a pack discharging profile. The profiles generally establish maximum current rates, maximum voltages, minimum voltages, and maximum temperatures for the reconfigurable energy storage system 130. The profiles may monitor the state of charge, and perform cell balancing. The profiles may be temperature dependent, mileage (e.g., odometer-measured distances) dependent and/or operational life (e.g., time) dependent. The battery controller 104 may also be operational to communicate with the charging station 90 via the control pilot signal and/or communication link, and switch on/off the charging power 122 received from the charging station 90 via the charging receptacle 110.

The on-board diagnostics circuit 106 implements built-in diagnostics circuitry. The on-board diagnostics circuit 106 is operational to monitor the operations of the electric vehicle 100 during normal operation and recharging operations. The monitoring may include, but is not limited to, monitoring the high voltage of each module of the reconfigurable energy storage system 130, monitoring the charging voltage 124a-124b received from the charging station 90 and monitoring an operating voltage 182a-182b presented to the vehicle high voltage components 190.

The charging receptacle 110 implements an electrical socket housing pins that mate with sockets in the cable 92 of the charging station 90. The charging receptacle 110 is operational to receive electrical power from the charging station 90 via power pins, connect the vehicle chassis ground 102 to an electrical ground of the charging station 90 via another pin, and transfer the control pilot signal and communication data between the charging station 90 and the battery controller 104 via signal pins.

The interface circuit 120 implements a power interface control circuit. The interface circuit 120 may present the charging power 122 at the charging voltage 124a-124b from the power pins to a pair of charging rails 123a-123b, respectively. Control of the interface circuit 120 may be provided by the battery controller 104 or other electronic control unit in the electric vehicle 100.

The reconfigurable energy storage system 130 (RESS) implements one or more battery packs. The reconfigurable energy storage system 130 is operational to store electrical energy, transfer electrical power to the vehicle high voltage components 190, and be recharged from the charging station 90. As illustrated, the reconfigurable energy storage system 130 includes at least a first submodule 132a and a second submodule 132b. Each submodule 132a-132b may implement a battery pack, a battery module, or strings of battery cells. Other numbers of submodules 132a-132b may be implemented to meet a design criteria of a particular application. Each submodule 132a-132b may provide approximately 200 Vdc to 800 Vdc electrical potential (e.g., 400 Vdc).

The reconfigurable energy storage system 130 may be arranged to selectively operate in a series mode 134, a parallel mode 136, and a separated mode 138. In the series mode 134, the first submodule 132a and the second submodule 132b are electrically coupled to each other in series through the diode 140. The serial coupling enables the reconfigurable energy storage system 130 to receive power from the charging station 90 at a higher rate for a given charging current due to the higher charging voltage. In the parallel mode 136, the first submodule 132a and the second submodule 132b are electrically coupled to each other in parallel. In the separated mode 138, the first submodule 132a and the second submodule 132b are electrically disconnected from each other and a single one of the first submodule 132a or the second submodule 132b is arranged to power the vehicle high voltage components 190. Using only one of the two submodules 132a-132b to power the vehicle high voltage components 190 may be implemented in some embodiments. Furthermore, the first submodule 132a and the second submodule 132b are generally separated when the electric vehicle 100 is switched off.

The diode 140 implements one or more power diodes (one shown). The diode 140 is operational to transfer the charging power 122 between the first submodule 132a and the second submodule 132b while the reconfigurable energy storage system 130 is operating in the series mode 134.

The bias circuit 150 implements a pi-shaped resistance network. The bias circuit 150 is operational to bias the diode 140 while reconfigurable energy storage system 130 is in the series mode 134. A top portion of the pi-shaped resistance network is directly coupled between the first node 142 and the second node 144 of the diode 140. In some cases, the bias circuit 150 uses the voltages of the first submodule 132a and the second submodule 132b to reverse bias the diode 140. In other cases, the bias circuit 150 uses a biasing current (FIG. 5, 127) received from the charging station 90 to bias the diode 140.

The isolation circuit 170 implements one or more switches and/or contactors. Where implemented, the isolation circuit 170 is electrically connected between the diode 140 and one of the first submodule 132a (illustrated) or the second submodule 132b. During a recharging session, the isolation circuit 170 presents a low impedance that allows the charging power 122 to flow through the diode 140 between the first submodule 132a and the second submodule 132b. While the reconfigurable energy storage system 130 is in the parallel mode 136 or the separated mode 138, the isolation circuit 170 presents a high impedance and/or a redundant directional current block between the first submodule 132a and the second submodule 132b through the diode 140 and the bias circuit 150. Control of the isolation circuit 170 may be provided by the battery controller 104 or other electronic control unit in the electric vehicle 100.

The switching circuit 180 implements multiple sets of switching devices. The switching circuit 180 is operational to electrically arrange the reconfigurable energy storage system 130 in the series mode 134, the parallel mode 136, and the separated mode 138, in conjunction with the isolation circuit 170 and the diode 140. The switching circuit 180 is also operational to route electrical power (e.g., the operating voltage 182a-182b) from the reconfigurable energy storage system 130 to the vehicle high voltage components 190. Control of the switching circuit 180 may be provided by the battery controller 104 or other electronic control unit in the electric vehicle 100.

The vehicle high voltage components 190 implement one or more electric propulsion system components and one or more accessory high voltage components. The electric propulsion system components may include, but are not limited to, a front inverter, and/or a rear inverter. The accessory high voltage components may include, but are not limited to, an air conditioning compressor, an auxiliary power module, an on-board charge module, electrical motors, and pumps. Other high voltage components may be implemented to meet a design criteria of a particular application.

Figure 2:
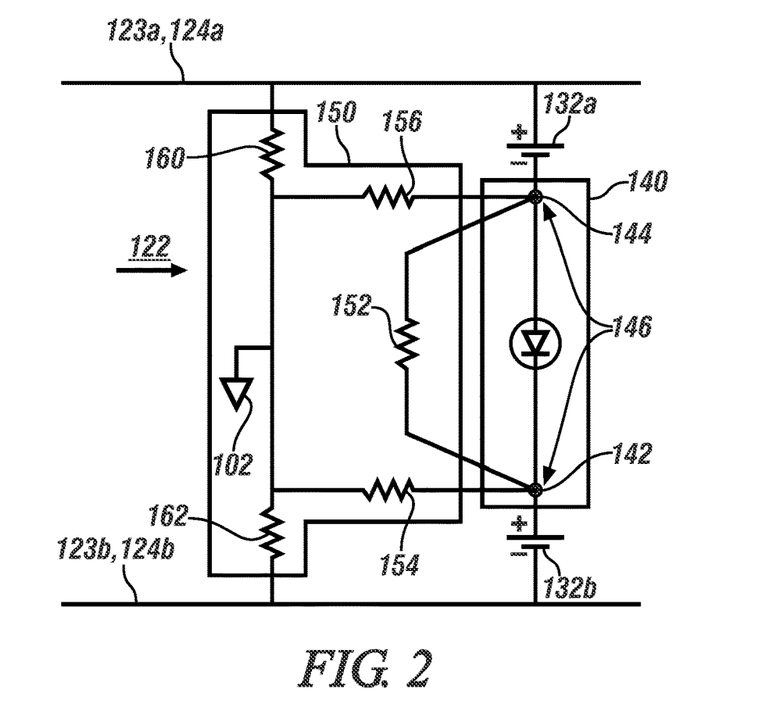
FIG. 2 is a schematic diagram of a bias circuit in accordance with one or more exemplary embodiments.

Referring to FIG. 2, a schematic diagram of an example implementation of the bias circuit is shown in context in accordance with one or more exemplary embodiments. The bias circuit 150 includes a first resistance 152, a second resistance 154, a third resistance 156, a fourth resistance 160, and a fifth resistance 162.

The first resistance 152 implements one or more resistors, connected in series and/or parallel. The first resistance 152 is directly connected between the first node 142 and the second node 144 of the diode 140. The first resistance 152 is operational to provide a small voltage drop across the diode 140 that maintains a reverse bias 146 across the diode 140.

The second resistance 154, the third resistance 156, the fourth resistance 160, and the fifth resistance 162 each implements one or more isolation resistances, connected in series and/or parallel, that are physically within the reconfigurable energy storage system 130 and logically part of the bias circuit 150, or resistances physically part of the bias circuit 150. The second resistance 154 is directly connected between a positive terminal circuit of the second submodule 132b (connected to the first node 142) and the vehicle chassis ground 102. The third resistance 156 is directly connected between a negative terminal circuit of the first submodule 132a (connected to the second node 144) and the vehicle chassis ground 102. The fourth resistance 160 is directly connected between the positive terminal circuit of the first submodule 132a and the vehicle chassis ground 102. The fifth resistance 162 is directly connected between the negative terminal circuit of the second submodule 132b and the vehicle chassis ground 102. The second resistance 154, the third resistance 156, the fourth resistance 160, and the fifth resistance 162 represent the overall equivalent resistance measured between the positive and negative terminals, respectively, and the vehicle chassis ground 102. The second resistance 154, the third resistance 156, the fourth resistance 160, and the fifth resistance 162 may be implemented by multiple resistors connected in series and/or parallel as part of various sensing or other circuitry within bias circuit 150 or within the first submodule 132a and the second submodule 132b. Generally, the resistances 154, 156, 160, and 162 may be coupled to the positive or negative busbar at some point other than at the power terminals. Other parts of the system (e.g. the vehicle high voltage components 190, the interface circuit 120, and/or the charging station 90) may be connected to the reconfigurable energy storage system 130 in the various modes. The parts may also have parasitic or designed resistances that appear in parallel with the resistances 154, 156, 160, and/or 162.

While (i) the charging station 90 is electrically disconnected from the charging receptacle 110, (ii) the vehicle high voltage components 190 are electrically disconnected by the switching circuit 180, and (iii) the reconfigurable energy storage system 130 is in the series mode 134 (see FIG. 1), the fourth resistance 160 and other internal isolation resistances (not shown) generally pull a voltage at the positive terminal of the first submodule 132a toward the vehicle chassis ground 102. Likewise, the fifth resistance 162 and other internal isolation resistances (not shown) generally pull a voltage at the negative terminal of the second submodule 132b toward the vehicle chassis ground 102. As a result, the second node 144 is at a lower voltage than the first node 142 and the reverse bias 146 is established across the diode 140. In such a condition, current may flow through the first resistance 152. By choosing the appropriate value of the first resistance 152 in relation to values of the second resistance 154, the third resistance 156, the fourth resistance 160, and the fifth resistance 162, the voltage across the parallel combination of the first resistance 152 and the diode 140 is limited to a low value, on the order of a few volts.

While the charging station 90 is applying the charging voltage 124a-124b to the charging rails 123a-123b, a voltage difference between the charging rails 123a-123b may exceed a combined voltages across the first submodule 132a and the second submodule 132b resulting in the second node 144 being at a higher voltage than the first node 142 and so the diode 140 is forward biased. The forward biased diode 140 enables the charging power 122 to simultaneously charge the series-connected first submodule 132a and the second submodule 132b. The voltages as the first node 142 and the second node 144 with respect to the vehicle chassis ground 102 may be both positive, both negative, or one negative and the other positive, depending on the values of the second resistance 154, the third resistance 156, the fourth resistance 160, and the fifth resistance 162.

Figure 3:
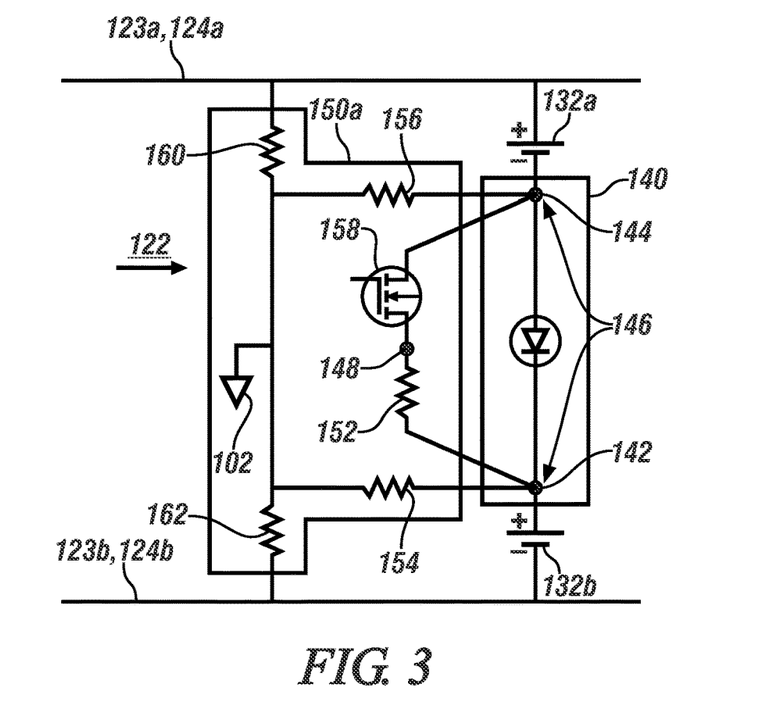
FIG. 3 is a schematic diagram of another bias circuit in accordance with one or more exemplary embodiments.

Referring to FIG. 3, a schematic diagram of an example implementation of another bias circuit is shown in context in accordance with one or more exemplary embodiments. The bias circuit 150a may be a variation of the bias circuit 150. The bias circuit 150a includes a third node 148, the first resistance 152, the second resistance 154, third resistance 156, the fourth resistance 160, the fifth resistance 162, and a bias switch 158.

In the bias circuit 150a, the first resistance 152 is directly connected between the first node 142 and the third node 148. The bias switch 158 is directly connected between the second node 144 and the third node 148 (e.g., in series with the first resistance 152).

The bias switch 158 implements a switching device. In various embodiments, the bias switch 158 may be a relay, a solid state switch (e.g., a transistor), a contactor, an electromechanical switch, or similar electrically switchable device. Control of the bias switch 158 may be provided by the battery controller 104 or other electronic control unit in the electric vehicle 100.

While the reconfigurable energy storage system 130 is in the series mode 134 (see FIG. 1), the bias switch 158 may be closed such that the voltage at the second node 144 is driven below the voltage at the first node 142 to establish the reverse bias 146 across the diode 140. In such a condition, current may flow through the first resistance 152. By choosing the appropriate value of the first resistance 152 in relation to values of the second resistance 154, the third resistance 156, the fourth resistance 160, and the fifth resistance 162, the voltage across the parallel combination of the first resistance 152, the bias switch 158 and the diode 140 is limited to a low value, on the order of a few volts. While the reconfigurable energy storage system 130 is in the parallel mode 136 or the separated mode 138 (see FIG. 1), the bias switch 158 may be opened to electrically remove the first resistance 152 from between the first submodule 132a and the second submodule 132b to extinguish a current leak through the first resistance 152. In the separated mode, opening the bias switch 158 also reduces the voltage between the positive terminal of the first submodule 132a and vehicle chassis ground 102, and the negative terminal of the second submodule 132b and the vehicle chassis ground 102, which may reduce stress on circuit components.

Figure 4:
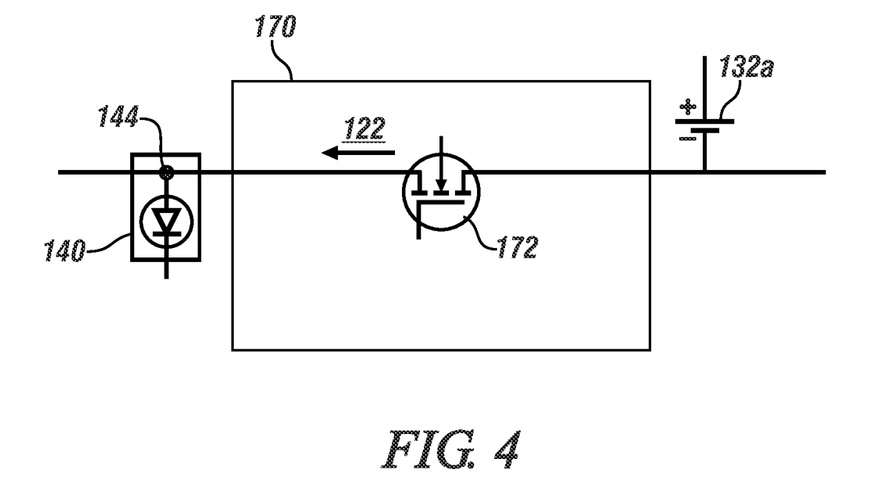
FIG. 4 is a schematic diagram of an isolation circuit in accordance with one or more exemplary embodiments.

Referring to FIG. 4, a schematic diagram of an example implementation of the isolation circuit 170 is shown in context in accordance with one or more exemplary embodiments. Implementation of the isolation circuit 170 in the electric vehicle 100 is optional. The isolation circuit 170 generally includes an isolation switch 172. The isolation circuit 170 may be electrically connected between the diode 140 and either the first submodule 132a (shown) or the second submodule 132b.

The isolation switch 172 implements a switching device. In various embodiments, the isolation switch 172 may be one or more transistors, one or more solid-state switches, or other solid state devices capable of blocking current flow in at least one direction. In other embodiments, the isolation switch 172 may be one or more relays, one or more contactors, one or more electromechanical switches, one or more single event or resettable disconnect devices, or similar electrically switchable devices. The isolation switch 172 is operational to carry the charging current of the charging power 122 while closed.

While the reconfigurable energy storage system 130 is in the series mode 134 (see FIG. 1), the isolation switch 172 may be closed to couple the first submodule 132a and the second submodule 132b. During a charging session while the charging station 90 is presenting the charging power 122, the isolation switch 172 provides a low impedance/high-current-capacity path between the first submodule 132a and the second submodule 132b. While the reconfigurable energy storage system 130 is in the parallel mode 136 of the separated mode 138 (see FIG. 1), isolation switch 172 may be opened to electrically remove the diode 140 and the first resistance 152 (FIG. 3) from between the first submodule 132a and the second submodule 132b.

Figure 5:
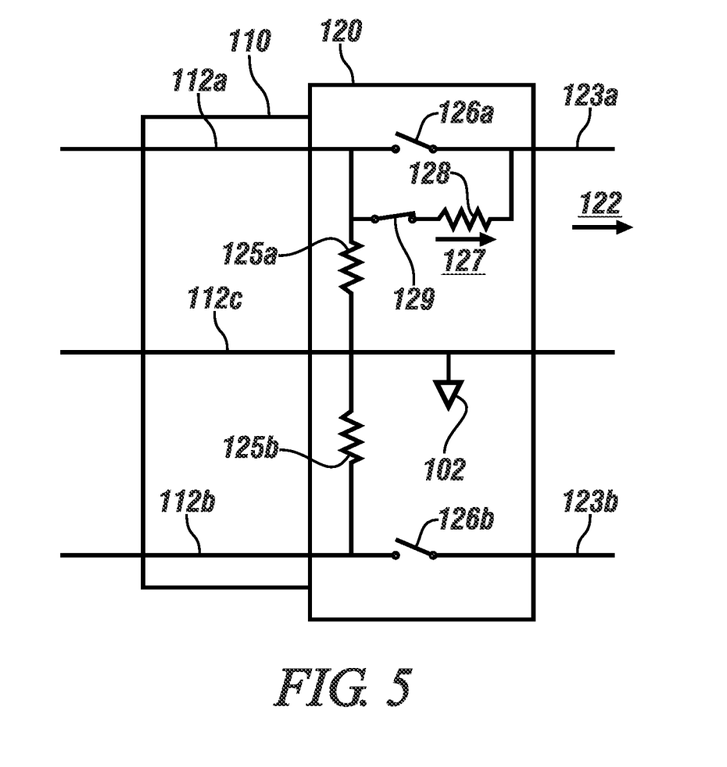
FIG. 5 is a schematic diagram of an interface circuit in accordance with one or more exemplary embodiments.

Referring to FIG. 5, a schematic diagram of an example implementation of the interface circuit 120 is shown in context in accordance with one or more exemplary embodiments. The interface circuit 120 generally includes multiple isolation resistances 125a-125b, multiple power contactors 126a-126b, an optional pre-charge resistance 128, and an optional pre-charge switch 129.

The isolation resistances 125a-125b implement designed and/or parasitic resistances between power pins 112a-112b of the charging receptacle 110 and the vehicle chassis ground 102 (connected to a ground pin 112c in the charging receptacle 110). The isolation resistances 125a-125b represent the overall equivalent resistance measured, with power contactors 126a-126b open to disconnect the power pins 112a-112b from the charging rails 123a-123b, between the positive and negative power pins 112a-112b, respectively, and the vehicle chassis ground 102 including parasitic resistances. The isolation resistances 125a-125b may be implemented by multiple resistors connected in series and/or parallel as part of various sensing or other circuitry within the interface circuit 120.

The power contactors 126a-126b each implements one or more high power switching devices. The power contactors 126a-126b are directly connected between the power pins 112a-112b and the charging rails 123a-123b. The power contactors 126a-126b are operational to electrically connect and disconnect the charging rails 123a-123b to and from the charging station 90 (FIG. 1) via the charging receptacle 110. The power contactors 126a-126b are closed during a charging session. Otherwise, the power contactors 126a-126b are open. Control of the power contactors 126a-126b may be provided by the battery controller 104 or other electronic control unit in the electric vehicle 100.

The pre-charge resistance 128 implements a resistor. The pre-charge resistance 128 is coupled in parallel to one of the power contactors 126a-126b (e.g., power contactor 126a is illustrated). The pre-charge resistance 128 is operational to provide a controlled biasing current 127 from the charging station 90 to forward bias the diode 140 before the charging power 122 is permitted to pass to the charging rails 123a-123b.

The pre-charge switch 129 implements a switching device. In various embodiments, the pre-charge switch 129 may be a relay, a solid state switch (e.g., a transistor), a contactor, an electromechanical switch, or similar electrically switchable device. The pre-charge switch 129 is directly connected in series to the pre-charge resistance 128 and in parallel to the one power contactor 126a. Control of the pre-charge switch 129 may be provided by the battery controller 104 or other electronic control unit in the electric vehicle 100.

While the charging station 90 is providing a charging voltage to the electric vehicle 100 and the power contactors 126a-126b are open, the pre-charge switch 129 is closed to enable the biasing current 127 to flow through the pre-charge resistance 128 to the diode 140 (FIG. 1). Opening the pre-charge switch 129 extinguishes the biasing current 127. While the charging station 90 is disconnected from the electric vehicle 100, the pre-charge switch 129 is opened to prevent a high voltage produced by the reconfigurable energy storage system 130 from appearing on the power pins 112a-112b.

Figure 6:
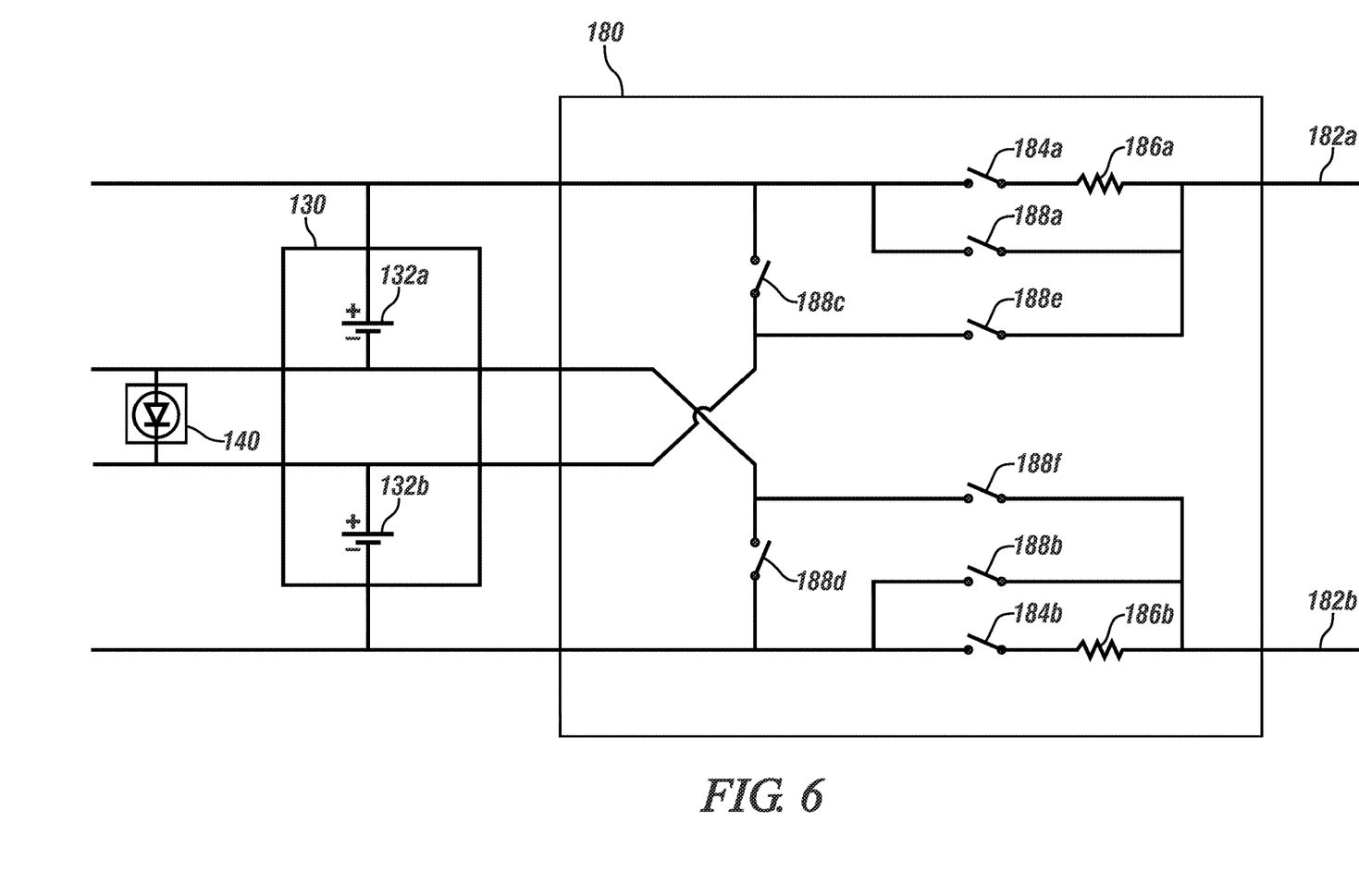
FIG. 6 is a schematic diagram of a switching circuit in accordance with one or more exemplary embodiments.

Referring to FIG. 6, a schematic diagram of an example implementation of the switching circuit 180 is shown in context in accordance with one or more exemplary embodiments. The switching circuit 180 generally includes one or more pre-charge switches 184a-184b (two shown), one or more pre-charge resistances 186a-186b (two shown), and multiple routing switches 188a-188f.

Two pre-charge switches 184a-184b are connected in series to the pre-charge resistances 186a-186b. While the pre-charge switches 184a-184b are closed, an operating voltage 182a-182b, provide from the first submodule 132a and/or the second submodule 132b of the reconfigurable energy storage system 130, may be passed through the pre-charge resistances 186a-186b to the vehicle high voltage components 190 (FIG.1) thereby limiting inrush currents and allowing capacitors in the components to charge up before the main contactors are closed. Two routing switches 188a-188b are connected to route the operating voltage 182a-182b around the pre-charge resistances 186a-186b to provide full electrical power from the reconfigurable energy storage system 130 to the vehicle high voltage components 190.

Two routing switches 188c-188d are connected to the reconfigurable energy storage system 130 to arrange the first submodule 132a and the second submodule 132b in parallel while closed. Two routing switches 188a and 188f are connected to the reconfigurable energy storage system 130 to couple the first submodule 132a alone to the vehicle high voltage components 190. Two routing switches 188b and 188e are connected to the reconfigurable energy storage system 130 to couple the second submodule 132b alone to the vehicle high voltage components 190. The pre-charge switches 184a-184b and the routing switches 188a-188f may be open while the diode 140 couples the first submodule 132a and the second submodule 132b in series for high voltage recharging, or configured to connect only one of the two submodules 132a-132b to the vehicle high voltage components 190 during charging. The open pre-charge switches 184a-184b and the open routing switches 188a-188f also shield the vehicle high voltage components 190 from the charging voltage 124a-124b received from the charging station 90 (FIG. 1). In various embodiments, a subset of the routing switches 188a-188f may be implemented in some systems. For example, the routing switches 188c-188d may be implemented to connect the first submodule 132a and the second submodule 132b in parallel when closed, and in series (through the diode 140) when open. The routing switches 188a-188b may be implemented to pass the operating voltage 182a-182b to the vehicle high voltage components 190. The routing switches 188e-188f may be eliminated. Other arrangements of the switches may be implemented to meet a design criteria of a particular application. The pre-charge switches 184a-184b and the routing switches 188a-188f may not be closed in such a way as to connect the vehicle high voltage components 190 across the full voltage of both submodules 132a-132b in series, but may be closed to connect across one of the submodules 132a or 132b.

Figure 7:
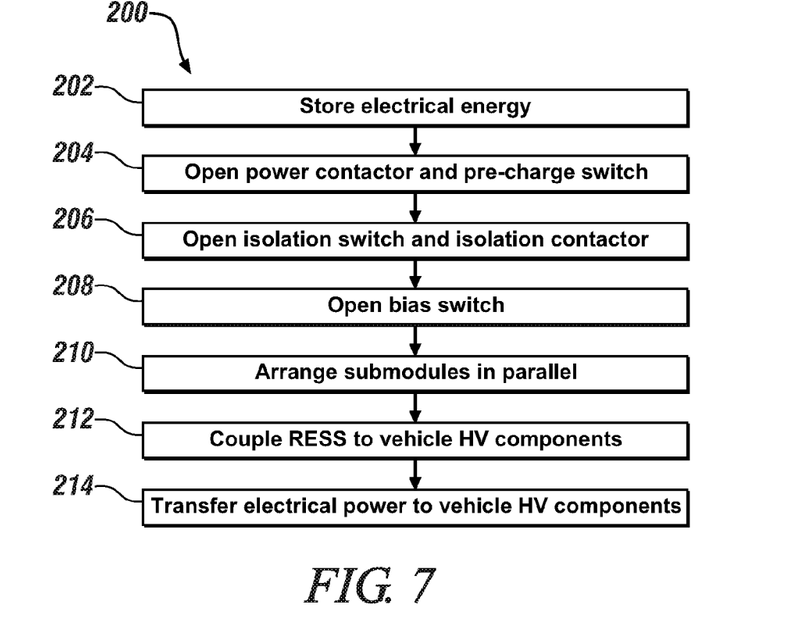
FIG. 7 is a flow diagram of a method for configuring an electrical system of an electrical vehicle in preparation for driving in accordance with one or more exemplary embodiments.

Referring to FIG. 7, a flow diagram of an example method for configuring the electrical system of the electrical vehicle 100 in preparation for driving is shown in accordance with one or more exemplary embodiments. The method 200 (or process) is implemented in the electric vehicle 100. The method 200 includes the steps 202 to 214, as illustrated. The sequence of steps is shown as a representative example. Other step orders may be implemented to meet the criteria of a particular application.

In the step 202, the reconfigurable energy storage system 130 may store electrical energy. The power contactors 126a-126b and the pre-charge switch 129 are opened in the step 204. The isolation switch 172 is opened in the step 206. In embodiments where the bias circuit 150a is implemented, the bias switch 158 is opened in the step 208 to disconnect the first resistance 152 from across the diode 140

In the step 210, the switching circuit 180 electrically arranges the first submodule 132a and the second submodule 132b in parallel to place the reconfigurable energy storage system 130 in the parallel mode 136. The switching circuit 180 may couple the reconfigurable energy storage system 130 to the vehicle high voltage components 190 in the step 212. In the step 214, electrical power is transferred from the reconfigurable energy storage system 130 through the switching circuit 180 to the vehicle high voltage components 190 while the reconfigurable energy storage system 130 is in the parallel mode 136 or the separated mode 138.

Figure 8:
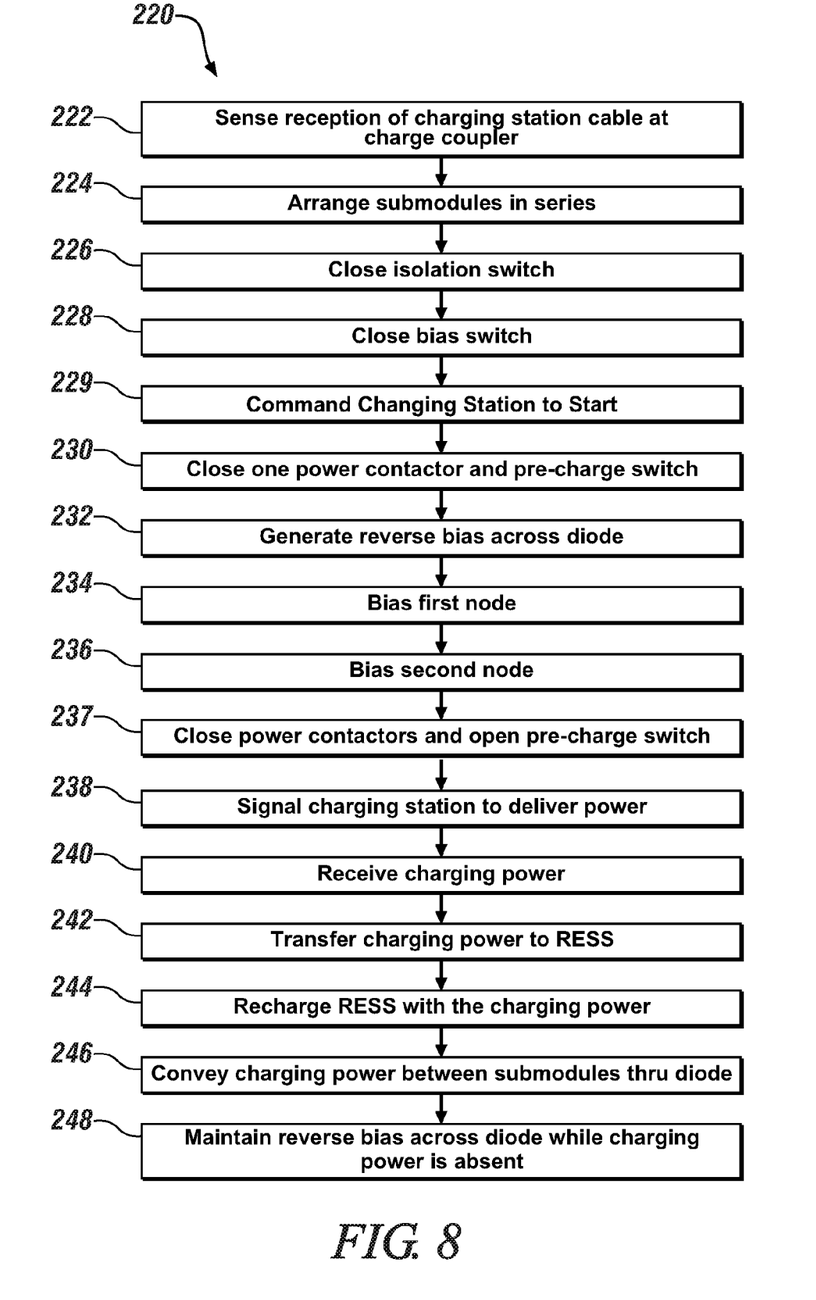
FIG. 8 is a flow diagram of a method for recharging a reconfigurable energy storage system in accordance with one or more exemplary embodiments.

Referring to FIG. 8, a flow diagram of an example method for recharging the reconfigurable energy storage system is shown in accordance with one or more exemplary embodiments. The method 220 (or process) is implemented in the electric vehicle 100 interacting with the charging station 90. The method 220 includes the steps 222 to 246, as illustrated. The sequence of steps is shown as a representative example. Other step orders may be implemented to meet the criteria of a particular application.

In the step 222, reception of the cable 92 of the charging station 90 at the charging receptacle 110 is sensed by the onboard electronics. In response, the switching circuit 180 electrically arranges the first submodule 132a and the second submodule 132b in series in the step 224 (by opening the internal switches) to place the reconfigurable energy storage system 130 in the series mode 134 with the diode 140. The isolation switch 172 (where implemented) may be closed in the step 226. The bias switch 158 (where implemented) is closed in the step 228 to couple the first resistance 152 across the diode 140 for biasing purposes. The charging station 90 may be commanded to output a voltage equal to the total pack voltage in step 229. The pre-charge switch 129 (where implemented) and an opposite power contactor 126a or 126b may be closed in the step 230.

Once in the series mode 134, the reverse bias 146 is generated in a controlled fashion across the diode 140 due to the first resistance 152 in the step 232. The voltage on the first node 142 is increased in the step 234 in response to a second resistance 154 and the fifth resistance 162. The voltage at the second node 144 is decreased in response to the third resistance 156 and the fourth resistance 160 in the step 236.

Once a voltage match between the charger pins 112a-112b and the charging rails 123a-123b has been confirmed, both power contactors 126a-126b may be closed and the pre-charge switch 129 opened in step 237. In the step 238, the electric vehicle 100 signals permission to the charging station 90 to deliver power. The electric vehicle 100 receives the charging power 122 at the charging receptacle 110 in the step 240. The charging power 122 is subsequently transferred in the step 242 to the reconfigurable energy storage system 130. The charging power 122 recharges the reconfigurable energy storage system 130 in the series mode 134 in the step 244. The charging power 122 is conveyed between the first submodule 132a and the second submodule 132b through a diode 140 in the step 246 while the reconfigurable energy storage system 130 is in the series mode 134 and the charging power 122 is present. Approximate an end to the charging session while the charging power 122 is absent, the reverse bias 146 is maintained across the diode 140 by the bias circuit 150 in the step 248 while the reconfigurable energy storage system 130 is in the series mode 134.

Figure 9:
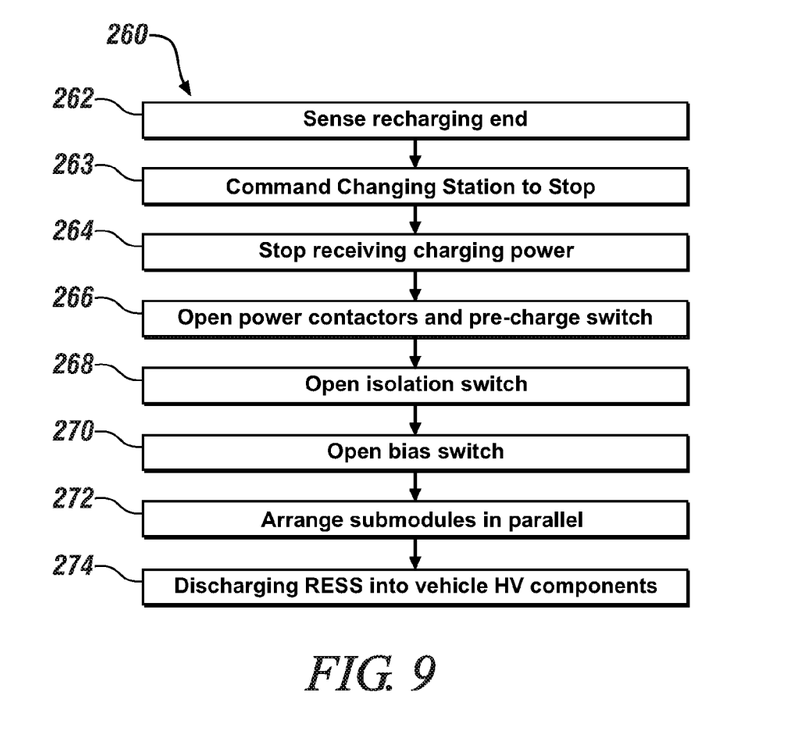
FIG. 9 is a flow diagram of a method for ending the recharge in accordance with one or more exemplary embodiments.

Referring to FIG. 9, a flow diagram of an example method for ending the recharge of the electric vehicle is shown in accordance with one or more exemplary embodiments. The method 260 (or process) is implemented in the electric vehicle 100 interacting with the charging station 90. The method 260 includes the steps 262 to 274, as illustrated. The sequence of steps is shown as a representative example. Other step orders may be implemented to meet the criteria of a particular application.

In the step 262, an end of the charging session is sensed by the electric vehicle 100. The vehicle subsequently sends a communication to the charging station 90 to reduce the power to zero in the step 263. The charging receptacle 110 stops receiving the charging power 122 in the step 264. The power contactors 126a-126b are opened and the pre-charge switch 129 (where implemented) is opened in the step 266 to extinguish the charging power 122 and the biasing current 127. In the step 268, the isolation switch 172 is opened to disconnect the diode 140 from between the first submodule 132a and the second submodule 132b. The bias switch 158 may be opened in the step 270. The switching circuit 180 electrically arranges the first submodule 132a and the second submodule 132b in parallel to place the reconfigurable energy storage system 130 in the parallel mode 136 or the separated mode 138 in the step 272. In the step 274, the reconfigurable energy storage system 130 may be discharged into the vehicle high voltage components 190 while in the parallel mode 136 or the separated mode 138.

Embodiments of the disclosure generally provide an electric vehicle having a charge receptacle configured to receive a cable of a charging station to electrically recharge a reconfigurable energy storage system. An interface circuit having power contactors selectively connects the charge receptacle to the reconfigurable energy storage system. The reconfigurable energy storage system is configured to receive a charging power (e.g., charging current) from the charging station. The reconfigurable energy storage system includes at least a first submodule and a second submodule, each configured to store energy.

An electric propulsion system having one or more components (e.g., a front inverter and/or a rear inverter, an air conditioning compressor, and an auxiliary power module, etc.) is selectively and electrically connected to the reconfigurable energy storage system. Multiple routing switches are configured to selectively and electrically connect the submodules in parallel, in series, and separately. The routing switches may also connect the rechargeable energy submodules to one or more of the electric propulsion components.

A power diode is configured to be forward biased allowing the first submodule and the second submodule to be charged in series through the charge receptacle. The power diode is reverse biased while the routing switches couple the first submodule and the second submodule in parallel or separately. A bias circuit controls the voltage across the power diode while the first submodule and the second submodule are connected in series in order to limit the reverse voltage appearing across the diode. In various embodiments, one or more additional switching devices may be coupled in series with the power diode.

In some embodiments, the bias circuit includes a first resistance added in parallel to the power diode. The first resistance is sufficiently low such that a voltage across the first resistance is low relative to the proportion of the voltage drop occurring across the overall effective isolation resistances between high voltage rails and the vehicle chassis ground. The first resistance may be sufficiently high that the power dissipation is limited to allow a physically small resistor to be implemented. In various embodiments, a switching device may be added in series with the first resistance to prevent current flow through the first resistance while the reconfigurable energy storage system is in the parallel mode or the separated mode.

In some embodiments, control of the voltage across the power diode is provided by a pre-charge switch in series with a pre-charge resistance arranged in parallel with one of charge receptacle switches. The pre-charge switch in series with a pre-charge resistance allows the external charging station to provide a biasing current to the power diode when the pre-charge switch is closed and the charge receptacle switches are open.

Analysis of the bias voltage and current through the power diode used to perform series-parallel switching of the rechargeable storage submodules is complex due to dependency on the isolation resistances of the devices connected between high voltage rails and the vehicle chassis ground. In order to produce a robust, consistent biasing current, designs take into account variations that may occur in the total isolation resistance due to operating modes, charger variations, and other factors. Potential failure modes and worst case currents are also to be taken into account for the designs.

Various embodiments use a diode singly or paired with a solid-state switch or mechanical contactor to perform the series switching function for implementing a series charging mode. A series charging mode allows an electric vehicle to take advantage of available charging voltages that may be two or more times higher than the nominal operating voltage of the system. Advantages of the diode compared to other means (either a solid state switch or a mechanical contactor) of implementing series-parallel switching include robustness, simplicity of control, size, and cost. Since the diode limits charging of the battery pack to the series mode, and becomes reverse biased during series discharge or parallel modes, the diode protects against fault conditions such as a short circuit at the charging station interface, thereby avoiding other components that may otherwise be implemented to protect against such faults. The various embodiments eliminate a possible voltage instability at the diode under near-zero current conditions that may cause interoperability issues with DC charging stations or diagnostic routines in the vehicle.

Embodiments of the disclosure generally provide an electric vehicle that includes a reconfigurable energy storage system with a first submodule and a second submodule, an interface circuit, a switching circuit, a diode, and a bias circuit. The reconfigurable energy storage system is operable to store electrical energy, recharge from a charging power while in a series mode, and discharge while in a parallel mode or a separated mode. The interface circuit transfers the charging power to the reconfigurable energy storage system from a charging station external to the electric vehicle. The switching circuit electrically arranges the first submodule and the second submodule in series to place the reconfigurable energy storage system in the series mode, and electrically arranges the first submodule and the second submodule in parallel to place the reconfigurable energy storage system in the parallel mode. The diode is operable to convey the charging power between the first submodule and the second submodule while the reconfigurable energy storage system is in the series mode and the charging power is present. The bias circuit is directly connected to the diode, and is operable to maintain a reverse bias across the diode while the reconfigurable energy storage system is in the series mode and the charging power is absent.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. An electric vehicle comprising:
   a reconfigurable energy storage system that includes a first submodule and a second submodule, wherein the reconfigurable energy storage system is operable to store electrical energy, recharge from a charging power while in a series mode, and discharge while in a parallel mode
   an interface circuit operable to transfer the charging power to the reconfigurable energy storage system from a charging station external to the electric vehicle;
   a switching circuit operable to electrically arrange the first submodule and the second submodule in series to place the reconfigurable energy storage system in the series mode, and electrically arrange the first submodule and the second submodule in parallel to place the reconfigurable energy storage system in the parallel mode;
   a diode that includes a first node and a second node, wherein the diode is operable to convey the charging power between the first submodule and the second submodule while the reconfigurable energy storage system is in the series mode and the charging power is present; and
   a bias circuit directly connected to the diode, and operable to maintain a reverse bias across the diode while the reconfigurable energy storage system is in the series mode and the charging power is absent.

2. The electric vehicle according to claim 1, wherein
   the electric vehicle further includes a vehicle chassis ground, and
   the bias circuit includes:
      a first resistance directly connected between the first node and the second node, and operable to generate the reverse bias across the diode;
      a second resistance directly connected between the first node and the vehicle chassis ground; and
      a third resistance directly connected between the second node and the vehicle chassis ground.

3. The electric vehicle according to claim 2, wherein the third resistance is coupled between the first submodule and the vehicle chassis ground.

4. The electric vehicle according to claim 1, wherein
the electric vehicle further includes a vehicle chassis ground, and
the bias circuit includes:
   a third node;
   a bias switch directly connected between the second node and the third node, wherein the bias switch is operational to close while the reconfigurable energy storage system is in the series mode, and open while the reconfigurable energy storage system is in the parallel mode;
   a first resistance directly connected between the first node and the third node, wherein the bias switch and the first resistance are operational to generate the reverse bias across the diode;
   a second resistance directly connected between the first node and the vehicle chassis ground; and
   a third resistance directly connected between the second node and the vehicle chassis ground.

5. The electric vehicle according to claim 1, further comprising:
   an isolation switch connected between the diode and the first submodule, wherein the isolation switch is operational to close while the reconfigurable energy storage system is in the series mode, and open while the reconfigurable energy storage system is in the parallel mode.

6. The electric vehicle according to claim 1, wherein the interface circuit is further configured to:
   close a pre-charge switch and an opposing one of a plurality of power contactors to receive a pre-charge current from the charging station; and
   close another of the plurality of power contactors to receive the charging power from the charging station.

7. The electric vehicle according to claim 1, further comprising:
   a plurality of power contactors coupled between the charging station and the reconfigurable energy storage system, and operational to convey the charging power while the reconfigurable energy storage system is in the series mode.

8. The electric vehicle according to claim 1, wherein the first submodule is a 400 volt direct current submodule, and the second submodule is another 400 volt direct current submodule.

9. The electric vehicle according to claim 1, wherein the interface circuit includes:
   a power contactor coupled between the charging station and the reconfigurable energy storage system;
   a pre-charge resistance coupled in parallel to the power contactor, and operable to transfer a biasing current from the charging station that biases the diode; and
   a pre-charge switch coupled in series with the pre-charge resistance, operable to close to enable the biasing current through the pre-charge resistance, and operable to open to extinguish the biasing current.

10. A method for controlling a recharge of an electric vehicle comprising:
    storing electrical energy in a reconfigurable energy storage system that includes a first submodule and a second submodule;
    arranging electrically with a switching circuit the first submodule and the second submodule in series to place the reconfigurable energy storage system in a series mode;
    transferring a charging power to the reconfigurable energy storage system from a charging station external to the electric vehicle;
    recharging the reconfigurable energy storage system with the charging power while the reconfigurable energy storage system is in the series mode;
    conveying the charging power between the first submodule and the second submodule through a diode while the reconfigurable energy storage system is in the series mode and the charging power is present, wherein the diode includes a first node and a second node;
    maintaining a reverse bias across the diode with a bias circuit while the reconfigurable energy storage system is in the series mode and the charging power is absent;
    arranging electrically with the switching circuit the first submodule and the second submodule in parallel to place the reconfigurable energy storage system in a parallel mode; and
    discharging the reconfigurable energy storage system while the reconfigurable energy storage system is in the parallel mode.

11. The method according to claim 10, further comprising:
    generating the reverse bias across the diode with a first resistance, wherein:
       the first resistance is directly connected between the first node and the second node;
       a second resistance is directly connected between the first node and a vehicle chassis ground; and
       a third resistance is directly connected between the second node and the vehicle chassis ground.

12. The method according to claim 11, wherein the third resistance is coupled between the first submodule and the vehicle chassis ground.

13. The method according to claim 10, further comprising:
    closing a bias switch while the reconfigurable energy storage system is in the series mode, wherein the bias switch is directly connected between the second node and a third node;
    generating the reverse bias across the diode with the bias switch and a first resistance, wherein:
       the first resistance is directly connected between the first node and the third node;
       a second resistance is directly connected between the first node and a vehicle chassis ground; and
       a third resistance is directly connected between the second node and the vehicle chassis ground; and
    opening the bias switch while the reconfigurable energy storage system is in the parallel mode.

14. The method according to claim 10, further comprising:
    closing an isolation switch while the reconfigurable energy storage system is in the series mode, wherein the isolation switch is connected between the diode and the first submodule; and
    opening the isolation switch while the reconfigurable energy storage system is in the parallel mode.

15. The method according to claim 10, wherein the transferring of the charging power comprises:
    closing a pre-charge switch and an opposing one of a plurality of power contactors in an interface circuit to receive a pre-charge current from the charging station; and
    closing another of the plurality of power contactors to receive the charging power from the charging station.

16. The method according to claim 10, further comprising:
conveying the charging power through a plurality of power contactors while the reconfigurable energy storage system is in the series mode, wherein the plurality of power contactors is coupled between the charging station and the reconfigurable energy storage system.

17. The method according to claim 10, wherein the first submodule is a 400 volt direct current submodule, and the second submodule is another 400 volt direct current submodule.

18. The method according to claim 10, further comprising:
opening a power contactor coupled between the charging station and the reconfigurable energy storage system;
closing a pre-charge switch arranged in series with a pre-charge resistance;
transferring a biasing current from the charging station through the pre-charge switch and the pre-charge resistance to forward bias the diode, wherein the pre-charge resistance and the pre-charge switch are coupled in parallel to the power contactor; and
opening the pre-charge switch to extinguish the biasing current.

19. An electric vehicle comprising:
a reconfigurable energy storage system that includes a first submodule and a second submodule, wherein the reconfigurable energy storage system is operable to store electrical energy, recharge from a charging power while in a series mode, and discharge while in a parallel mode;
an interface circuit operable to transfer the charging power to the reconfigurable energy storage system from a charging station external to the electric vehicle;
a switching circuit operable to electrically arrange the first submodule and the second submodule in series to place the reconfigurable energy storage system in the series mode, and electrically arrange the first submodule and the second submodule in parallel to place the reconfigurable energy storage system in the parallel mode; and
a diode that includes a first node and a second node, wherein the diode is operational to convey the charging power between the first submodule and the second submodule while the reconfigurable energy storage system is in the series mode and the charging power is present,
wherein the interface circuit includes:
a power contactor coupled between the charging station and the reconfigurable energy storage system;
a pre-charge resistance coupled in parallel to the power contactor, and operable to transfer a biasing current from the charging station that biases the diode; and
a pre-charge switch coupled in series with the pre-charge resistance, operable to selectively close to enable the biasing current through the pre-charge resistance, and operable to open to extinguish the biasing current.

20. The electric vehicle according to claim 19, further comprising:
an isolation switch connected between the diode and the first submodule, wherein the isolation switch is operational to close while the reconfigurable energy storage system is in the series mode, and open while the reconfigurable energy storage system is in the parallel mode.

* * * * *